(12) United States Patent
Knight (10) Patent No.: US 6,554,558 B2
(45) Date of Patent: *Apr. 29, 2003

(54) MATERIAL-HANDLING VEHICLE (75) Inventor: David John Knight, Cheddleton (GB)

(73) Assignee: J.C. Bamford Excavators Limited, Staffordshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,162

(22) Filed: Apr. 5, 1999

(65) Prior Publication Data
US 2002/0012580 A1 Jan. 31, 2002

(30) Foreign Application Priority Data

Apr. 9, 1998 (GB) .............................. 9807532

(51) Int. Cl.[7] .............................................. B66C 23/00
(52) U.S. Cl. ...................................... 414/685; 180/299
(58) Field of Search ................................ 414/680, 685; 180/291, 299, 300, 245, 246, 89.12, 295, 297; 212/180

(56) References Cited

U.S. PATENT DOCUMENTS

| 3,865,205 A | * | 2/1975 | Swanson ................. 180/292 X |
| 3,937,339 A | * | 2/1976 | Geis et al. ............... 414/718 X |
| RE30,021 E | | 6/1979 | Olson et al. |
| 4,194,639 A | * | 3/1980 | Grove .................... 212/180 X |
| 4,535,964 A | * | 8/1985 | Schutz et al. ........... 180/299 X |
| 4,585,088 A | * | 4/1986 | Ward .......................... 180/295 |
| 5,836,733 A | | 11/1998 | Moses et al. |

FOREIGN PATENT DOCUMENTS

| CA | 2009968 | 8/1991 |
| DD | 240 869 A1 | 11/1986 |
| DE | 27 39 537 A1 | 3/1978 |
| EP | 0 656 315 A1 | 11/1994 |
| GB | 2 000 734 A | 1/1979 |
| GB | 2 294 019 A | 4/1996 |
| WO | WO 89/00972 | 2/1989 |

* cited by examiner

Primary Examiner—Donald W. Underwood
(74) Attorney, Agent, or Firm—Marshall, Gerstein & Borun (57) ABSTRACT A material-handling vehicle comprising a structure having, ground engageable propulsion means, a loader arm mounted for up and down swinging movement, an operator's cab, an engine having an output to provide power for said movement of the loader arm and propulsion of the vehicle and drive to connect the output to the ground engageable propulsion means to propel the vehicle, wherein the output of the engine is kinematically connected to a change speed gearbox which drives at least a rear axle of the vehicle, at least one of the engine and change speed gearbox being connected to the rear axle to provide a sub-assembly and said sub-assembly being mounted on said structure for pivotal movement about an axis which lies in, or is parallel to, a plane which contains the longitudinal axis of the vehicle.

41 Claims, 4 Drawing Sheets

MATERIAL-HANDLING VEHICLE

DESCRIPTION OF INVENTION

This invention relates to a material-handling vehicle of the kind, hereinafter referred to as the "kind specified", including a structure having, ground engageable propulsion means, a loader arm mounted for up and down swinging movement, an operator's cab, an engine having an output to provide power for said movement of the loader arm and propulsion of the vehicle and drive to connect the output to the ground engageable propulsion means to propel the vehicle.

One vehicle of the kind specified is disclosed in U.S. Pat. No. Re-30,021. In this machine, which is relatively large, the loader arm is substantially horizontal but is angled downwardly in the forward direction, is partly accommodated in a well provided between the cab and a load carrying platform disposed on the opposite side of the loader arm to the operator's cab. As a result the loader arm, in a fully lowered position, is disposed below a horizontal plane containing the top of a steering wheel in the operator's cab so that the driver's vision is substantially unobstructed. This vehicle is sufficiently large that an upright engine to provide power for swinging movement of the arm and propulsion of the vehicle can be accommodated beneath the well on the centre line of the vehicle.

WO-A-89/00972, CA-A-2,009,968 and EP-A-0,656,315 discloses vehicles of the kind specified in which a loader arm, in a fully lowered position, is similarly substantially horizontal although the precise angle of the loader arm varies in the three above referred to specifications, is at least partly accommodated in a well disposed between the operator's cab and a housing in which the engine is disposed. The loader arm is disposed so it does not at least substantially interfere with the view of the operator in this direction.

A vehicle configuration as disclosed in these three references, in which the engine is offset to be on the opposite side of the loader arm to the cab, enables the vehicle to be made smaller than the vehicle of U.S. Pat. No. Re-30021 and enables the overall height of the vehicle to be reduced.

DE-A-2,739,537 discloses another vehicle of the kind specified but in which the loader arm, in its lowered position is disposed so that the loader arm is entirely above the level of the top of the engine and its associated housing. Accordingly the vehicle is unprovided with any well so that in a lowered position the loader arm extends alongside the operator s cab substantially above the bottom of a side window therein so that the driver's view transversely of the vehicle is obstructed.

All the above mentioned vehicles suffer from one or other disadvantage.

In U.S. Pat. No. Re-30,021 because of the disposition of the engine underneath the loader arm the operator's cab is required to be relatively high so that the operator can still see over the top of the loader arm whilst providing sufficient space beneath the loader arm for the accommodation of the engine and access to the engine is restricted.

In WO-A-89/00,972 the engine is arranged with the crank shaft thereof longitudinally of the vehicle. Access to the side of the engine adjacent to the cab is obstructed by the presence of the cab and the wheel base of the vehicle must be relatively large to accommodate the longitudinal extent of the engine between the wheels. A short wheel base is desirable as it improves maneuverability of the vehicle, which is important for operating in confined spaces. In a vehicle of the type described in this specification and as marketed by the applicants in respect of WO-A-89/00,972a hydrostatic drive is provided to transfer drive transversely from the engine towards the ground engageable means.

In CA-A-2,009,968 the engine is also arranged with its crank shaft longitudinally of the vehicle and so suffers from the disadvantages mentioned in the preceding paragraph. In this case a mechanical drive is provided to transfer drive transversely from the engine towards the ground engageable means.

DD A 240 869 discloses a drive for a mechanical handling vehicle of the kind specified in which the engine is disposed with its crank shaft transversely of the vehicle and an angle gear drive is provided to transfer drive through 90° from the engine towards the ground engageable means.

In EP-A-0,656,316 the engine is also disposed with its crank shaft transversely to the vehicle and an angle gear drive is provided to transfer drive through 90° from the engine towards the ground engageable means.

These vehicles suffer from the disadvantage of the need to provide a relatively expensive angle gear drive and associated engineering problems to turn the drive through 90°.

In DE-A-2,739,537 the driver's view transversely across the vehicle is obstructed because of the absence of a well to accommodate the loader arm.

An object of the present invention is to provide a material-handling vehicle of the kind specified whereby the above mentioned problems are overcome or are reduced.

According to the present invention we provide a material handling vehicle of the kind specified wherein the output of the engine is kinematically connected to a change speed gear box which drives at least a rear axle of the vehicle, at least one of the engine and the change speed gear box being connected to the rear axle to provide a sub-assembly and said sub-assembly being mounted on said structure for pivotal movement about an axis which lies in, or is parallel to, a plane which contains the longitudinal axis of the vehicle.

The engine may be disposed to the rear of the rear axle.

The gear box may be disposed to the front of the rear axle.

Said at least one of the engine and the change speed gear box may be connected to the rear axle by virtue of being mutually interconnected.

Alternatively said at least one of the engine and the change speed gear box may be connected to the rear axle by means of an intermediate member.

The intermediate member may comprise a frame to which the axle is connected and to which said at least one of the engine and change speed gear box is connected.

The engine and the change speed gear box and the real axle may be connected together to provide the sub-assembly.

The sub-assembly may comprise a mounting member.

The mounting member may be pivotally connected to said structure for rotation about said axis.

At least one of the engine, gear box and rear axle may be connected to the mounting member.

The change speed gear box may be provided with at least one output which is kinematically connected to said ground engageable propulsion means.

The change speed gear box may have two outputs.

The vehicle may comprise a front axle and a rear axle, ground engageable propulsion means mounted on the axles and the propulsion means of at least one of said axles being connected to said at least one output of the gearbox.

At least one of said axles may have a differential which is connected to said output of the gearbox.

The front axle may be connected to a front output of the gear box by a shaft which may have a universal joint at least at one end.

The rear axle of the vehicle may be connected to a rear output of the gear box.

The rear output of the gear box may comprise a shaft which extends to said rear axle.

The rear axle may be connected to said rear output by means of a shaft which drives a pinion gear which meshes with a crown-wheel gear of the differential.

A clutch, torque converter or the like may be provided between the engine and the ground engageable propulsion means.

The sub-assembly may be provided with a clutch or torque converter or the like.

The clutch or torque converter or the like may be provided on the input side of the sub-assembly.

The vehicle may comprise a chassis having a pair of spaced longitudinally extending frame members.

The frame members may be parallel to each other.

The frame members may be provided with a pair of spaced transversely extending members which carry a pivot member whereby said mounting member is mounted on the structure for rotation about said axis.

The engine may be disposed so as to lie substantially between spaced vertical planes containing said frame members.

Compliant mounts may be provided between at least the engine and the chassis.

The longitudinal axis of the loader arm may extend forwardly parallel to a vertical plane containing a longitudinal axis of the vehicle.

The structure may have a front end and a real end with said longitudinal axis of the vehicle extending therebetween and the ground engageable propulsion means being disposed equi-distant from, and on opposite sides of, said longitudinal axis.

The loader arm may be pivotally mounted towards the rear of the machine about a horizontal axis.

The loader arm may carry a material handling implement at its front end so that the material handling implement is disposed in front of the front of the structure when the arm is in its lowermost position.

The cab may have a side window which faces transversely across the vehicle at right angles to the longitudinal axis of the loader arm.

The top of the loader arm in a fully lowered position and at a location alongside the top of a steering wheel in the operator's cab may be disposed wholly or substantially wholly below a horizontal plane which is not more than 1 meter, or preferably not more than 0.5. meter, above the top of a steering wheel so that the driver's vision is substantially unobstructed by the loader arm.

If desired the top of the boom at said location may be wholly or substantially wholly below a horizontal plane containing the top of the steering wheel.

The loader arm may be telescopic in the direction of the longitudinal axis of the loader arm.

The longitudinal axis of the loader arm may lie in a substantially horizontal plane when the loader arm is in a position in which the implement engages a horizontal plane on which the ground engageable propulsion means are supported and, if the loader arm is telescopic, the loader arm is fully retracted.

The ground engageable propulsion means may be driven from the engine wholly via a mechanical transmission or a hydrokinetic transmission.

The ground engageable propulsion means may comprise a pair of ground engageable wheels disposed adjacent the front of the structure and a pair of rear ground engageable wheels adjacent the rear of the structure.

The wheels of the front pair may be driven from the first output of the gear box whilst the wheels of the rear pair may be driven by the rear output of the gear box.

Where the gear box and the rear axle are mutually interconnected the shaft which connects the rear output of the gear box to the rear axle may provide a direct drive.

Alternatively, the gear box may be spaced forwardly of the rear axle and mounted on the chassis.

In this case the shaft which connects the rear output of the gear box to the rear axle may be provided with a universal joint at least at one end.

In this case the gear box may have an input which is connected to the engine by a shaft having, at least at one end, a universal joint.

Preferably the shaft which is connected to the rear output of the gear box or the shaft which is connected to the input of the gear box has a universal joint at each end and means may be provided whereby the separation of the gear box from the rear axle or the engine respectively is variable.

Where at least one of the engine and gear box is connected to the rear axle to provide a sub-assembly through an intermediate member, such as a frame, the shaft which connects the rear output of the gear box to the rear axle may be external to a case of the gear box and the rear axle. The input of the gear box may be connected to the engine by a shaft which is external to the casing of the gear box and of the engine.

The invention will now be described by way of example with reference to the accompanying diagrammatic drawings in which.

Figure 1:
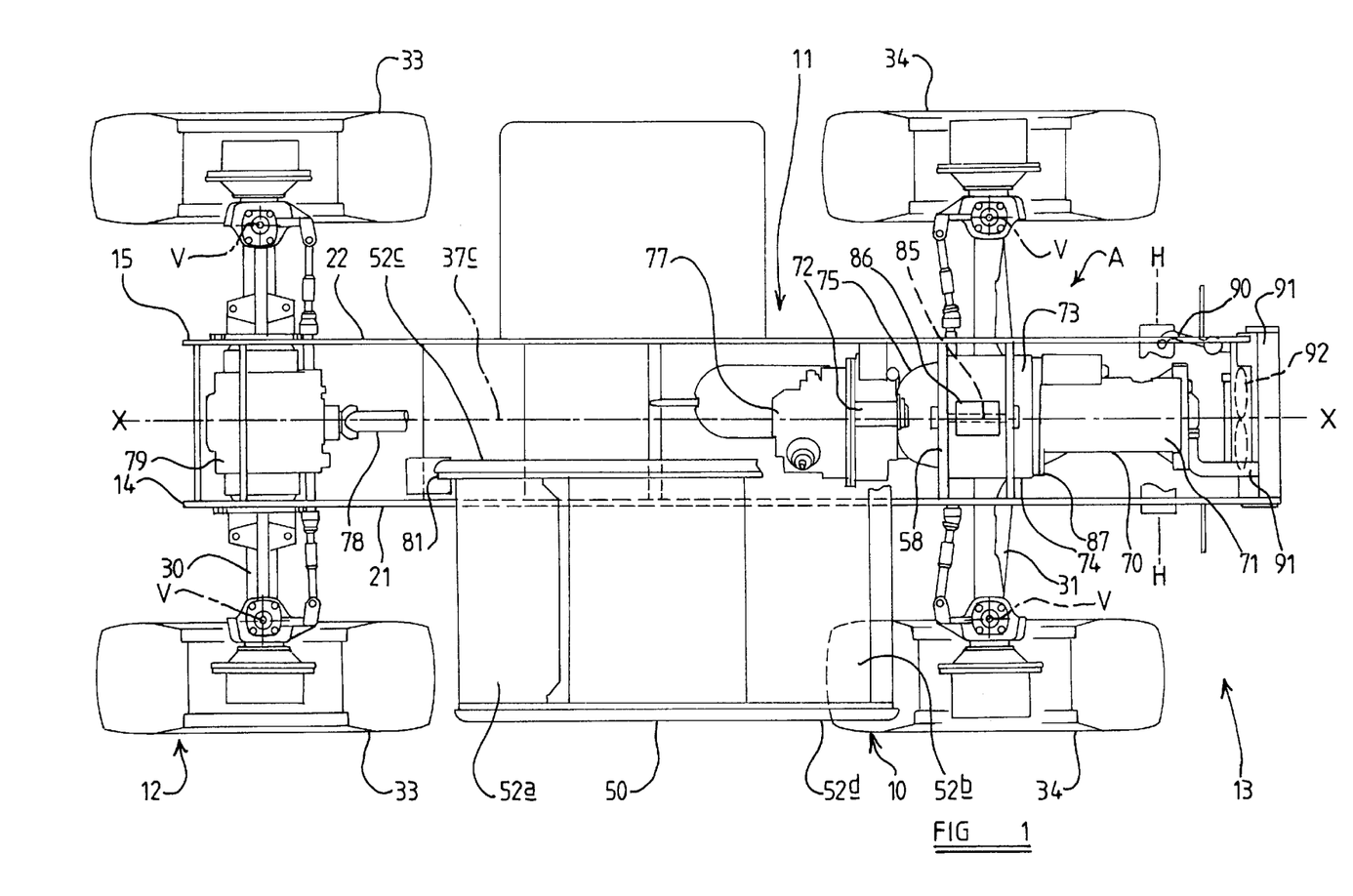
FIG. 1 is a fragmentary plan view of a telescopic loader vehicle embodying the invention.
Figure 2:
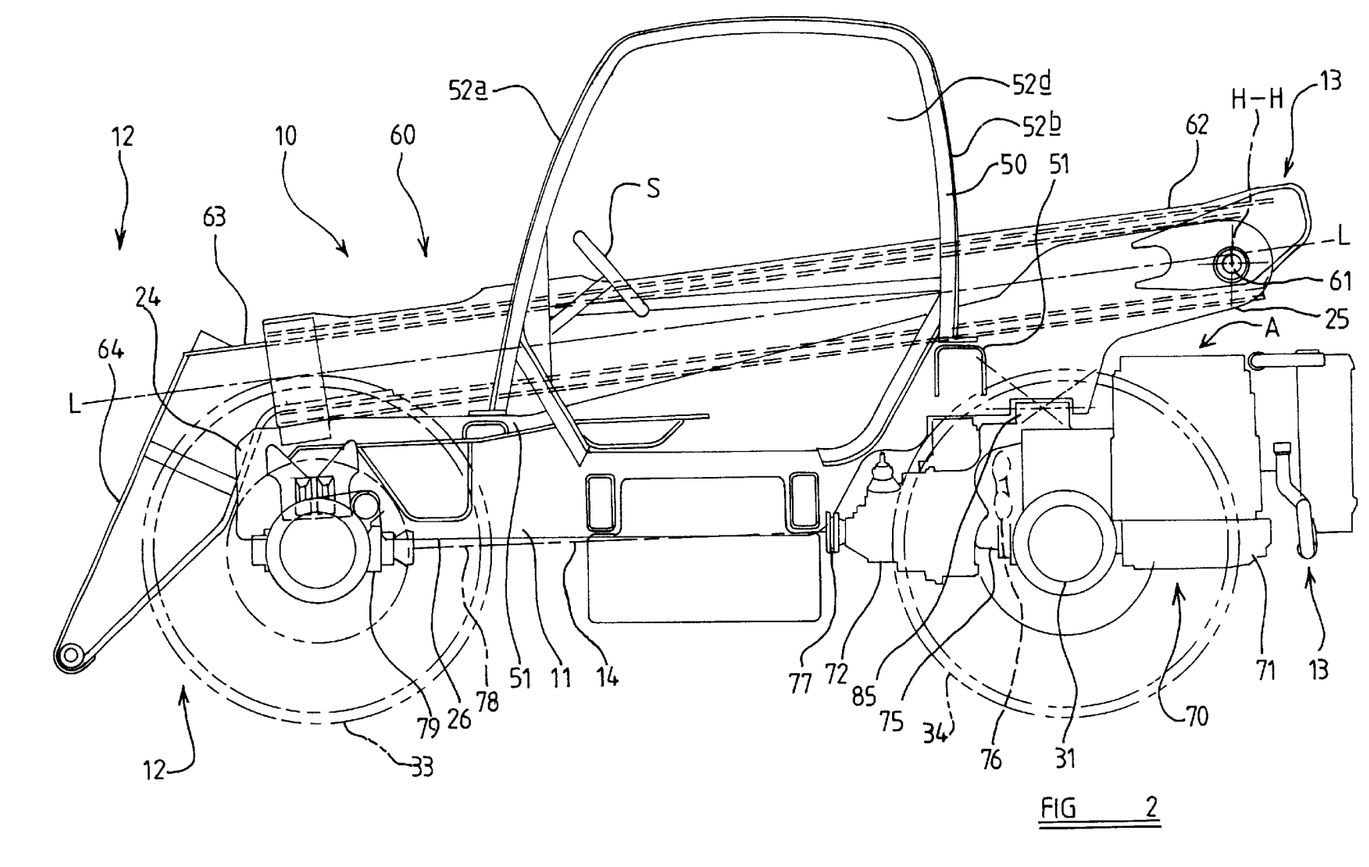
FIG. 2 is a fragmentary side elevation of the vehicle of FIG. 1.

Referring to FIGS. 1 and 2, a material-handling vehicle is indicated generally at 10 and comprises a main structure 11 having a front end 12 and a rear end 13 with a longitudinal axis X—X extending between the front and rear ends. The structure 11 comprises a pair of spaced parallel frame members 14, 15 held in spaced parallel relationship by cross members.

Each frame member 14, 15 has a upper surface 21, 22 respectively. At the front and rear, the frame members 14, 15 have front and rear end parts 24, 25 respectively whilst on their undersides they have a lower surface one of which is shown at 26.

A front axle 30 is mounted on the frame members 14, 15 at the front end thereof whilst a rear axle 31 is mounted on the frame members 14, 15 towards the rear thereof. The axles 30, 31 are of conventional type carrying at their opposite ends front wheels 33 and rear wheels 34 respectively. Both the front wheels 33 and both rear wheels 34 are pivotable relative to their associated axis about a steering axis V for steering movement of the vehicle, as shown in chain dotted line in FIG. 1.

An operator's cab 50 is mounted on the frame member 14 by vibration isolating mounts so that the cab 50 is supported on one side of the longitudinal axis X—X of the vehicle. The cab 50 has a front window 52*a* a rear window 52*b* and two side windows 52*c* 52*d* the window 52*c* facing transversely across the machine. The or each window may be provided with a transparent closure element such as glass, or may be open, or may be provided with a protective element such as a grille or bars. A driver's seat, steering wheel S and other controls, not shown, are provided in the cab and the cab is provided with an access door or opening on the side in which the window 52*d* is provided.

A loader arm 60, having a longitudinal axis L—L parallel to the longitudinal axis X—X of the vehicle, is pivotally mounted, by means of an axis member 61, between the frame members 14, 15 at the rear 13 of the vehicle for pivotal up and down swinging movement about a horizontal axis H—H. The loader arm 60 is telescopic and comprises a rear outer section 62 which is pivotally connected to the frame members 14 and 15 by the axis 61 and a forward inner member 63 which is telescopically slidable with the section 62 under the control of hydraulic ram means in conventional manner. At its front, end the part 63 is provided with a downwardly and forwardly extending part 64 adapted to carry a material handling implement such as a loader bucket or lifting forks or other desired material handling means. If desired the loader arm 60 may have more than two telescopically slidable sections or may not be telescopic.

A sub-assembly A comprising an integrated unit 70 comprising an internal combustion engine 71 having an output, the rear axle 31 and a change speed gear box 72 is disposed at a rear part of the vehicle between the frame members 14, 15. The engine 71 is, in the present example, a four cylinder diesel engine having a crankshaft, not shown, rotatable about an axis which lies in, or substantially in, the same vertical plane as the longitudinal axis X—X of the vehicle. If desired the vertical plane containing the crankshaft may be parallel to but displaced from the vertical plane containing the longitudinal axis X—X of the vehicle.

Figure 3:
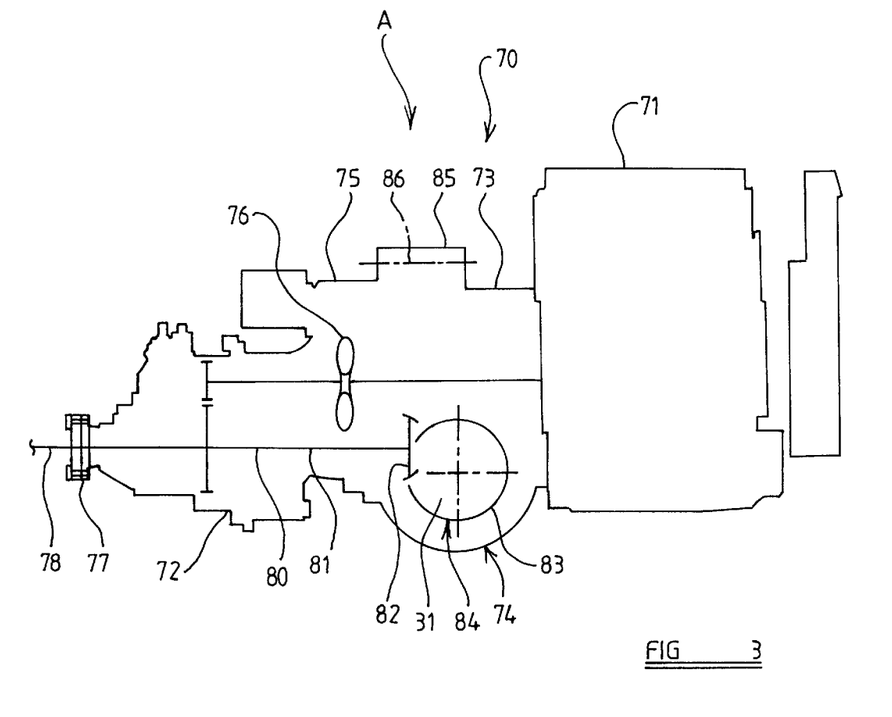
FIG. 3 is a diagrammatic illustration showing part of the drive path from the engine to the wheels of the vehicle of FIG. 1.

The engine 71 is fastened to a rearward part of a mounting member 73 to which is fastened a central part 74 of the rear axle 31 so that the axle 31 is in front of the engine 71. At the forward end of the mounting member 73 a housing 75 of a torque converter 76 is connected. Torque converter housing 75 is connected to, or formed wholly or partly integrally with, the change speed gear box 72 and change speed gear carrying shafts of the gear box 72 extend generally parallel to the longitudinal axis X—X of the vehicle. The torque converter may be omitted or provided in some other suitable position in the drive train or other means for disconnecting drive to the ground engaging propulsion means when the vehicle is standing may be provided.

The frame members 14, 15 are configured to accommodate the oscillating elements.

A forward output 77 of the gear box 72 is connected by a propeller shaft 78 to a differential 79 of the front axle 30. A rearward output 80 of the gear box 72 is connected by a shaft 81 to a bevel pinion 82 which meshes with a crown wheel 83 of a differential 84 of the rear axle 31. The shaft 81 is carried in suitable bearings housed in the mounting member 73 is disposed within the mounting member 73.

The mounting member 73 has an upstanding boss 85 which receives a pivot pin 86 which is supported at its ends by transverse members 87 which extend between the frame members 14, 15. Thus, the integrated unit 70 is mounted on the frame members 14, 15 for pivotal movement about the axis of the pivot pin 86 which, in the example illustrated, lies in a vertical plane containing the longitudinal axis X—X of the vehicle. If desired, the axis of the pivot pin 86 may be inclined forwardly and upwardly or forwardly and downwardly so that it may lie at an angle of, for example, + or −15° to the horizontal.

It will be appreciated that both the engine 71 and the gear box 72 are carried in cantilever on the rear and front sides respectively of the mounting member 73.

The gear box 72 drives a hydraulic pump 88 bolted to the gear box 72.

Although in this example the torque converter housing 75 is provided by virtue of the torque converter housing being separate from and bolted to, the gear box 72, if desired, the gear box may have an integral extension part which wholly or partly provides a torque converter housing part. Moreover, the torque converter may be housed in any other desired manner so as to be operatively disposed between the gear box and the engine or at any other suitable disposition in the drive path from the engine to the ground engageable propulsion means.

If desired, other forms of mechanical transfer means may be provided to transfer the drive between the engine and the gear box.

Disposed in the rear of the engine 71 is a cooling radiator 90 through which coolant of the engine 71 is circulated through pipes not shown, and the radiator 90 is provided with a mechanically operated fan 92, to cause flow of cooling air of the radiator. Suitable ventilation openings may be provided in the vehicle for flow of such air. If desired the radiator and/or fan may be positioned at another position on the vehicle and other drive means for the fan may be provided such as a hydraulic or electrical drive.

The width of the chassis is determined by the desired clearance between the chassis and the wheels.

The top of the loader arm 60 in a fully lowered position and at a location alongside the top of a steering wheel in the operator's cab is disposed wholly or substantially wholly below a horizontal plane which is not more than 1 meter, or preferably not more than 0.5 meter, above the top of the steering wheel so that the driver's vision is substantially unobstructed by the loader arm. If desired, and as in the present case, the top of the boom at said location is wholly below a horizontal plane containing the top of the steeling wheel.

The loader arm in its lowered position may be horizontal or may extend forwardly and downwardly The loader arm may be telescopic in the direction of the longitudinal axis of the loader arm.

The longitudinal axis of the loader arm may lie in a substantially horizontal plane when the loader arm is in a position in which the implement engages a horizontal plane on which the ground engageable propulsion means are supported and, if the loader arm is telescopic, the loader arm is fully retracted.

If desired the wheels on the front axle may have a different track to the wheels of the rear axle.

The wheels of an axle are equally distant from, and on opposite sides of, the longitudinal axis of the vehicle.

If desired the ground engageable propulsion means may comprise endless tracks extending fore and aft between the front and rear axles on a respective side of the vehicle.

By a "longitudinal axis of the vehicle" we mean an axis which passes through a mid point of the front wheel track and the rear wheel track of the vehicle.

A vehicle embodying the present invention is provided with a relatively low boom pivot even though the engine of the vehicle is at the rear thereby giving good visibility for an operator.

In addition the use of a modular gear train i.e. a gear train which is connected together to provide a transmission unit as described herein, eases assembly and manufacture of the machine.

In addition, by allowing either the engine and/or the gear box to oscillate with the axle with respect to the machine chassis and the boom the machine overall weight may be reduced for a given payload and lift envelope compared to a machine where only the mass of the axle is free to oscillate.

Figure 4:
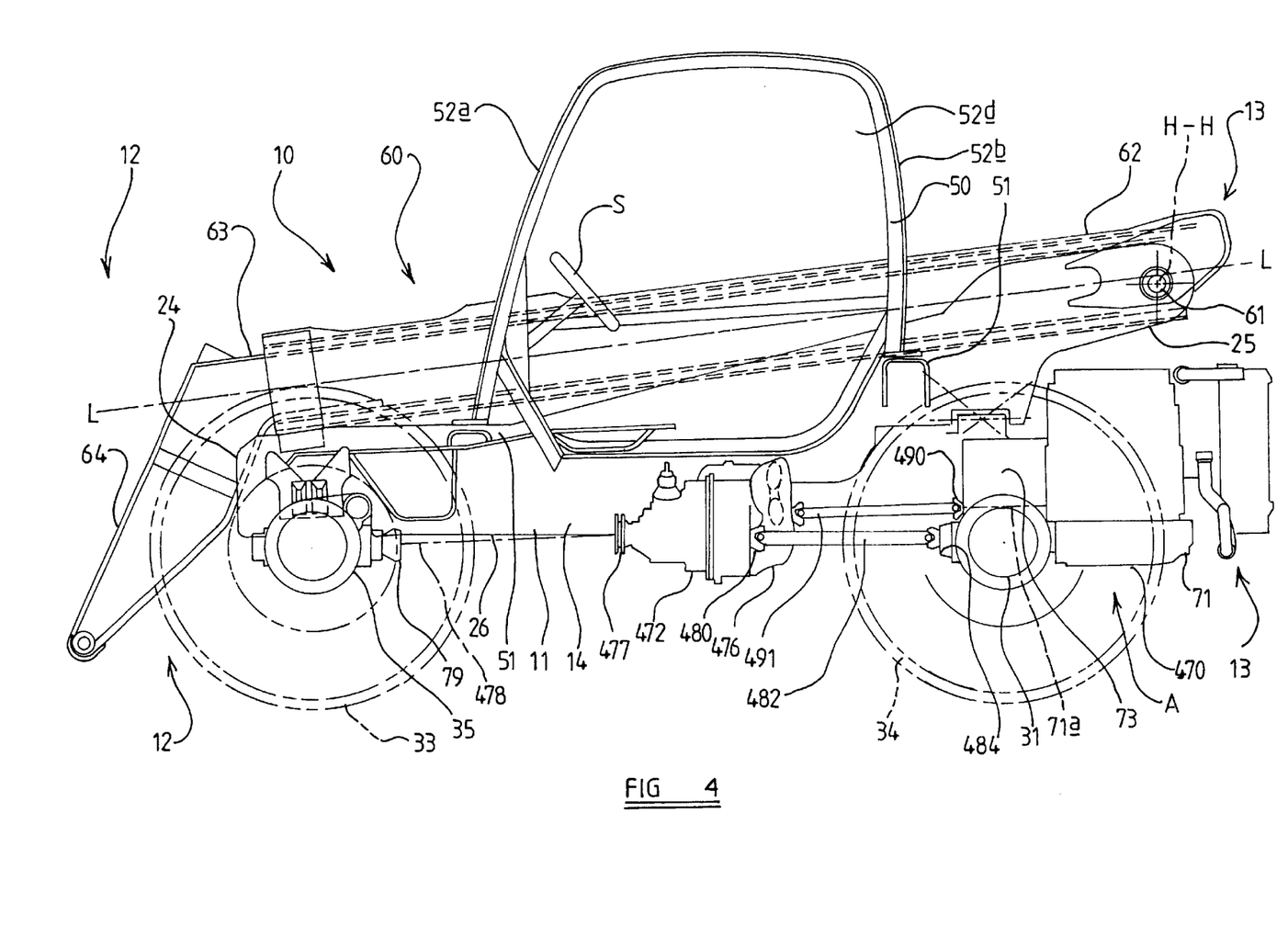
FIG. 4 is a view similar to that of FIG. 2 but showing an alternative embodiment of the invention.

Referring now to FIG. 4, there is shown an alternative embodiment of a vehicle similar to that shown with reference to FIGS. 1 to 3. In FIG. 4 the same reference numerals have been used to refer to corresponding parts and only the features of difference will be described hereinafter.

In this embodiment a sub-assembly A comprises an integrated unit 470 comprising an internal combustion engine 71 and the rear axle 31. In this embodiment a change speed gear box 472 is disposed substantially centrally of the vehicle and is mounted on the frame members 14, 15 by any suitable means. The gear box may be rigidly mounted on the frame members 14, 15 or mounted thereon by compliant mounting means.

The frame members 14, 15 may be cut away as desired to provide room for the gear box although normally the gear box would be of such a size that it can be disposed between the frame members.

The engine 71 and the way in which it is fastened to the mounting member 73 is as it is described in the previous embodiment.

The engine 71 drives a shaft 71a which extends through the mounting 73 to provide an output 490. Connected to the output 490 is an input shaft 491 such as a Cardan shaft which provides an input to a torque converter 476 which is connected to, or formed wholly or partly integrally with the change speed gear box 472. The torque converter may be omitted or provided in some other suitable position in the drive chain by other means for disconnecting drive to the ground engageable propulsion means when the vehicle is stationary may be provided.

The change speed gear box 472 has a forward output 477 which is connected by a propeller shaft 478 to a differential 79 of the front axle 30 as described in connection with the first embodiment.

A rearward output 480 of the gear box 472 is connected by a cardan shaft 482 to a conventional differential 484 of the rear axle 31.

In a further embodiment, not illustrated, a sub-assembly comprises a intermediate member, which may, for example, comprise a generally rectangular frame, on which is mounted the rear axle 31 and the engine 71. A change speed gear box may also be mounted on the intermediate member so as to be part of the sub-assembly which in this example would comprise the axle 31, engine 71 and change speed gear box 72. Alternatively the change speed gear box may be provided in a similar manner to the change speed gear box 472 of the embodiment shown in FIG. 4 with shafts being provided to connect the gear box to the rear axle of the sub-assembly in a similar manner to that shown in FIG. 4.

At least the engine may be mounted on the intermediate member by compliant mountings if desired.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A material handling vehicle including a structure having, ground engageable propulsion means, a loader arm mounted for up and down swinging movement, an operator's cab, an engine disposed to the rear of the vehicle and having an output to provide power for said movement of the loader arm and propulsion of the vehicle and drive to connect the output to the ground engageable propulsion means to propel the vehicle, wherein the output of the engine is kinematically connected to a change speed gearbox which drives at least a rear axle of the vehicle, the rear axle being a rigid drive axle and carrying at opposite ends thereof ground engaging propulsion means, at least one of the engine and change speed gearbox being connected to the rear axle to provide a sub-assembly and said sub-assembly being mounted on said structure for pivotal movement relative to the structure about only a single pivot axis which lies in, or is parallel to, a plane which contains the longitudinal axis of the vehicle.

2. A vehicle according to claim 1 wherein the engine is disposed to the rear of the rear axle.

3. A vehicle according to claim 1 wherein the gearbox is disposed to the front of the rear axle.

4. A vehicle according to claim 1 wherein a selected one of the engine and the change speed gearbox is directly connected to the rear axle.

5. A vehicle according to claim 1 wherein said sub-assembly includes an intermediate member and at least one of the engine and the change speed gearbox is connected to the rear axle by means of the intermediate member.

6. A vehicle according to claim 5 wherein the intermediate member includes a frame to which the axle is connected and to which said at least one of the engine and change speed gearbox is connected.

7. A vehicle according to claim 1 wherein the engine and the change speed gearbox and the rear axle are connected together to provide the sub-assembly.

8. A vehicle according to claim 1 wherein the sub-assembly includes a mounting member which is pivotally connected to said structure for rotation about said axis.

9. A vehicle according to claim 1 wherein the change speed gearbox is provided with at least one output which is kinematically connected to said ground engageable propulsion means.

10. A vehicle according to claim 1 wherein the vehicle includes a front axle and a rear axle, ground engageable propulsion mean mounted on the axles and the propulsion means of at least one of said axles being connected to said at least one output of the gearbox.

11. A vehicle according to claim 10 wherein at least one of said axles has a differential which is connected to said output of the gearbox.

12. A vehicle according to claim 10 wherein the front axle is connected to a front output of the gearbox by a shaft which has a universal joint at least at one end.

13. A vehicle according to claim 10 wherein the rear axle of the vehicle is connected to a rear output of the gearbox.

14. A vehicle according to claim 1 wherein the gearbox as a rear output which comprises a shaft which extends to said rear axle.

15. A vehicle according to claim 14 wherein said rear axle has a differential which is connected to said output of the gearbox and the rear axle is connected to said rear output by means of a shaft which drives a pinion gear which meshes with a crown-wheel gear of the differential.

16. A vehicle according to claim 1 wherein a clutch, torque converter, the like is provided between the engine and the ground engageable propulsion means.

17. A vehicle according to claim 16 wherein the subassembly is provided with a clutch or torque converter.

18. A vehicle according to claim 1 wherein the vehicle comprises a chassis having a pair of spaced longitudinally extending frame members.

19. A vehicle according to claim 18 wherein the frame members are provided with a pair of spaced transversely extending members which carry a pivot member whereby said mounting member is mounted on the structure for rotation about said axis.

20. A vehicle according to claim 18 wherein the engine is disposed so as to lie substantially between spaced vertical planes containing said frame members.

21. A vehicle according to claim 1 wherein the longitudinal axis of the loader arm extends forwardly parallel to a vertical plane containing a longitudinal axis of the vehicle.

22. A vehicle according to any claim 1 wherein the loader arm is pivotally mounted towards the rear of the machine about a horizontal axis.

23. A vehicle according to claim 1 wherein the top of the loader arm in a fully lowered position and at a location alongside the top of a steering wheel in the operator's cab is disposed wholly or substantially wholly below a horizontal plane which is not more than 1 meter, or preferably not more than 0.5 meters, above the top of a steering wheel so that the driver's vision is substantially unobstructed by the loader arm.

24. A vehicle according to claim 1 wherein the ground engageable propulsion means comprises a pair of ground engageable wheels disposed adjacent the front of the structure and a pair of rear ground engageable wheels adjacent the rear of the structure.

25. A vehicle according to claim 1 wherein the wheels of the front pair are driven from a front output of the gearbox whilst the wheels of the rear pair are driven by a rear output of the gearbox.

26. A vehicle according to claim 4 wherein the gearbox has a rear output which is connected by a shaft to the rear axle and said shaft provides a direct drive.

27. A vehicle according to claim 1 wherein the gearbox is spaced forwardly of the rear axle and mounted on the chassis.

28. A vehicle according to claim 27 including a shaft connecting a rear output of the gearbox to the rear axle and said shaft is provided with a universal joint at one end.

29. A vehicle according to claim 27 including a shaft having, at least at one end, a universal joint, and wherein the gearbox has an input which is connected to the engine by the shaft.

30. A vehicle according to claim 28 wherein the shaft which is connected to the rear output of the gearbox or the shaft which is connected to the input of the gearbox has a universal joint at each end and means are provided whereby the separation of the gearbox from the rear axle or the engine, respectively, is variable.

31. A vehicle according to claim 1 wherein said at least one of the engine and the change speed gearbox is connected to the rear axle by means of an intermediate member and the gearbox has a rear output and a shaft which connects the rear output to the rear axle is external to a case of the gearbox and the rear axle.

32. A vehicle according to claim 31 wherein the input of the gearbox is connected to the engine by a shaft which is external to the casing of the gearbox and of the engine.

33. A material handling vehicle having a loading arm and comprising:
a frame;
a plurality of drive wheels;
a subassembly, the subassembly comprising:
an engine, the engine including an output;
a transmission, the transmission having an input shaft operatively connected to the output of the engine and further having an output shaft, the transmission arranged to provide a plurality of driving speeds; and
a rigid axle, the rigid axle housing means for transmitting driving force to the drive wheels, the means adapted for connection to the output shaft;
at least one of the engine and the transmission mounted directly to the rigid axle; and
a pivot, the pivot pivotally joining the subassembly to the frame and providing the sole structural connection between the subassembly and the frame, the pivot further defining only a single pivot axis, the pivot axis positioned in a vertical plane that contains a longitudinal axis of the vehicle, the pivot arranged to permit the entire subassembly to pivot as an integrated unit about the pivot axis and relative to the frame.

34. The device of claim 33, wherein the pivot axis slopes upwardly toward a front end of the vehicle up to about 15 degrees.

35. The device of claim 33, wherein the pivot axis slopes downwardly toward a front end of the vehicle up to about 15 degrees.

36. The device of claim 33, including a mounting member secured to the rigid axle housing, the pivot formed at least in part by a protruding boss on the mounting member, the mounting member including a rearward portion, the engine mounted directly to the rearward portion.

37. The device of claim 33, wherein the engine and the transmission are disposed on opposite sides of the rigid axle housing.

38. The device of claim 36, wherein the mounting member is integrally formed with a portion of the rigid axle housing.

39. The device of claim 33, wherein at least one of the engine and the transmission is mounted directly to the rigid axle by a compliant mount.

40. The device of claim 33, wherein the frame includes a pair of spaced apart frame rails and includes a cross-member structure extending between the frame rails, and wherein the pivot includes a pivot pin engaging the cross-member structure.

41. A material handling vehicle having a loading arm and comprising:
a frame;
a plurality of drive wheels;
a subassembly, the subassembly comprising:
an engine, the engine including an output;
a transmission, the transmission having an input shaft operatively connected to the output of the engine and further having an output shaft, the transmission arranged to provide a plurality of driving speeds; and
a rigid axle, the rigid axle housing means for mechanically transmitting driving force from the output shaft of the transmission to at least some of the drive wheels, the means operatively connected to the output shaft of the transmission;

at least one of the engine and the transmission rigidly mounted directly to the rigid axle; and a pivot pivotally mounting the subassembly to the frame and arranged to permit the entire subassembly to pivot relative to the frame about a pivot axis, wherein the pivot defines the pivot axis, the pivot axis positioned in a vertical plane that intersects a longitudinal axis of the vehicle, the pivot arranged to provide the sole structural support of the subassembly to the frame.

* * * * *

UNITED STATES PATENT AND TRADEMARK OFFICE
CERTIFICATE OF CORRECTION

PATENT NO.      : 6,554,558 B2
DATED           : April 29, 2003
INVENTOR(S)     : David J. Knight It is certified that error appears in the above-identified patent and that said Letters Patent is hereby corrected as shown below:

<u>Column 9,</u>
Line 7, delete "converter, the like" and insert instead -- converter or the like --.

Signed and Sealed this

Fourth Day of May, 2004

JON W. DUDAS
*Acting Director of the United States Patent and Trademark Office*